United States Patent [19]

Engel

[11] Patent Number: 5,036,727
[45] Date of Patent: Aug. 6, 1991

[54] CONNECTING BOLT AND ASSEMBLY

[75] Inventor: Richard L. Engel, Columbia, Tenn.

[73] Assignee: Saturn Corporation, Troy, Mich.

[21] Appl. No.: 319,386

[22] Filed: Mar. 3, 1989

[51] Int. Cl.⁵ .............................................. G05G 1/00
[52] U.S. Cl. ................. 74/579 E; 74/579 R; 411/399; 403/14
[58] Field of Search .................. 74/579 R, 579 E; 123/197 AB, 197 AC; 29/156.5 A, 156.5 R

[56] References Cited

U.S. PATENT DOCUMENTS

| | | |
|---|---|---|
| 431,078 | 7/1890 | Russell, Jr. |
| 519,411 | 5/1894 | North et al. |
| 1,578,173 | 3/1926 | Retterath |
| 1,733,643 | 10/1929 | Bot .................. 74/579 E |
| 1,803,317 | 5/1931 | Brown ............... 74/579 E X |
| 1,836,949 | 12/1931 | Balough ............. 74/579 E |
| 1,847,742 | 3/1932 | Anderson ........... 74/579 E |
| 1,966,520 | 7/1934 | Rayner ............... 85/2 |
| 2,019,049 | 10/1935 | Hoke .................. 85/1 |
| 2,131,170 | 9/1938 | Evans ................ 74/579 E |
| 2,371,614 | 3/1945 | Graves ............... 74/579 E |
| 2,405,424 | 8/1946 | Herreshoff .......... 151/29 |
| 2,407,928 | 9/1946 | Herreshoff et al. ... 85/1 |
| 2,846,897 | 8/1958 | Schall ............... 74/579 E |
| 3,790,236 | 2/1974 | Pierce ............... 308/23 |
| 3,971,119 | 7/1976 | Walker .............. 29/416 |
| 3,971,355 | 7/1976 | Kottmann .......... 123/197 AB |
| 4,396,309 | 8/1983 | McCormick ....... 403/14 |
| 4,836,044 | 6/1989 | Löbig ............... 29/156.5 A X |

FOREIGN PATENT DOCUMENTS

| | | | |
|---|---|---|---|
| 933001 | 8/1955 | Fed. Rep. of Germany .... | 74/579 E |
| 2801617 | 7/1979 | Fed. Rep. of Germany .... | 74/579 E |
| 875417 | 8/1961 | United Kingdom ............. | 74/579 E |

Primary Examiner—Vinh T. Luong
Attorney, Agent, or Firm—Gordon F. Belcher

[57] ABSTRACT

A connecting rod assembly comprising a connecting rod having a rod lug, a connecting rod cap having a cap lug with the rod lug having a straight bore therein which coaxially aligns with a straight bore in said cap lug when the cap lug engages the rod lug. The connecting rod assembly further includes a bolt comprising a shank having an enlarged portion and a pilot portion. The enlarged portion has a cross section larger than each of the bores prior to insertion therein. The enlarged portion also has a tapered part, and is constructed of a sufficiently deformable material to enable insertion of said enlarged portion into each of the bores and fricitional retainment of the enlarged portion therein. The enlarged portion has a length sized so that it extends through a sufficient axial portion of each of the bores to hold the rod and cap lugs in abutting relation wherein the tapered part constitutes the entire part of the enlarged portion extending into one of the bores. The tapered part has a length sized to enable its ready disengagement from the one of the bores.

8 Claims, 1 Drawing Sheet

CONNECTING BOLT AND ASSEMBLY

FIELD OF THE INVENTION

This invention relates to connecting bolts for connecting together a connecting rod assembly such as for use in an internal combustion engine.

DESCRIPTION OF THE PRIOR ART

It is known in the art relating to connecting rods to use connecting bolts to connect together a connecting rod and connecting rod cap to form an assembly in which the two elements form the internal bearing surface where the connecting rod assembly attaches to the crankshaft of an internal combustion engine. Such connecting bolts can be inserted through a straight bore in the connecting rod and connecting rod cap.

Connecting bolts having a shank with a cross section larger than the bores in members to be held together are one kind of bolt known in the art. The shank of such bolts, sometimes known as body bound or press fitted bolts, is adapted to fit tightly in the bores to hold the members together in proper alignment. A problem associated with such bolts is that disengagement of the members from the shank can be difficult due to the tight fit of the shank in the bores. Another problem is that insertion of the shank into the bores can be difficult due to the enlarged cross section of the shank.

Bolts having a tapered shank are also known in the art. A problem associated with these types of bolts is that the bores must usually be tapered to correspond to the shank in order for the shank to fit tightly in the bores. The special machining required to produce such tapered bores can increase the manufacturing expense.

SUMMARY OF THE INVENTION

The present invention provides a connecting bolt for connecting together in an assembly a connecting rod and connecting rod cap, each having at least one straight bore therethrough, for use in an internal combustion engine. The connecting rod assembly comprises a connecting rod having a curved rod bearing surface attached to one end with the rod bearing surface having a rod lug formed thereon, and a connecting rod cap having a curved cap bearing surface and a cap lug attached thereto. The cap lug is engageable with the rod lug enabling the rod and cap bearing surfaces to form an annular housing adapted to encircle an axial portion of a crankshaft to connect the connecting rod thereto. The rod lug has a straight bore therein which coaxially aligns with a straight bore in the cap lug when the cap lug engages the rod lug.

The connecting rod assembly further includes a bolt comprising a shank having an enlarged portion and a pilot portion. The enlarged portion has a cross section larger than each of the bores prior to insertion of the enlarged portion therein. The enlarged portion has a tapered part adjacent to the pilot portion with the tapered part having a diameter which decreases in the axial direction toward the pilot portion. The enlarged portion is constructed of a sufficiently deformable material to enable insertion of the enlarged portion into each of the bores and frictional retainment of the enlarged portion therein.

The enlarged portion has a length sized so that, when the bores coaxially adjoin one another, the enlarged portion extends through a sufficient axial portion of each of the bores to hold the rod and cap lugs in abutting relation wherein the tapered part constitutes the entire part of the enlarged portion extending into one of the bores. The tapered part has a length sized to enable its ready disengagement from the one of the bores.

The pilot portion has a cross section smaller than the bores to facilitate insertion of the shank therein. The pilot portion is tapered so that, when the pilot portion passes through the bores, the enlarged portion is guided into coaxial relation therewith.

Extension of the enlarged portions of the bolts through the limited lengths of the connecting bores in the connecting rod cap limits the frictional retention of the cap to the bolts and so aids removal of the cap from the connecting rod. Thus, use of the bolt facilitates assembly as well as disassembly of the members which can be necessary for repairs, maintenance, improvements or the like. The bolt may be used with bores having a constant cross section and does not require that the bores be tapered, thereby eliminating the need for expensive machining to produce such bores.

These and other features and advantages of the invention will be more fully understood from the following description of certain specific embodiments of the invention taken together with the accompanying drawings.

BRIEF DRAWING DESCRIPTION

In the drawings.

Corresponding reference characters indicate corresponding parts throughout the several views of the drawings.

DESCRIPTION OF THE PREFERRED EMBODIMENTS

Figure 1:
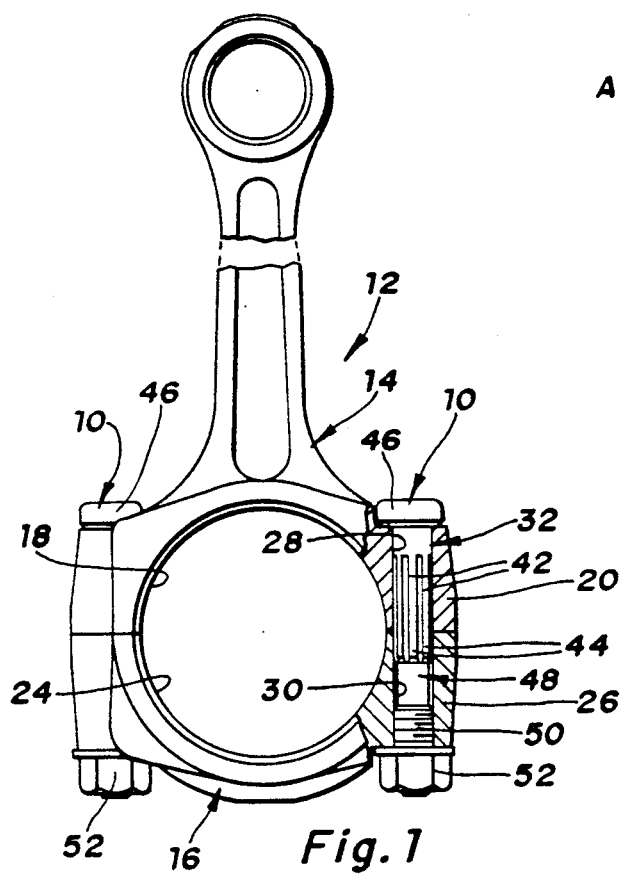
FIG. 1 is an elevational view of a connecting rod assembly including bolts in accordance with the present invention inserted into the connecting rod and connecting rod cap with parts of the rod and cap being broken away to show one of the bolts.
Figure 2:
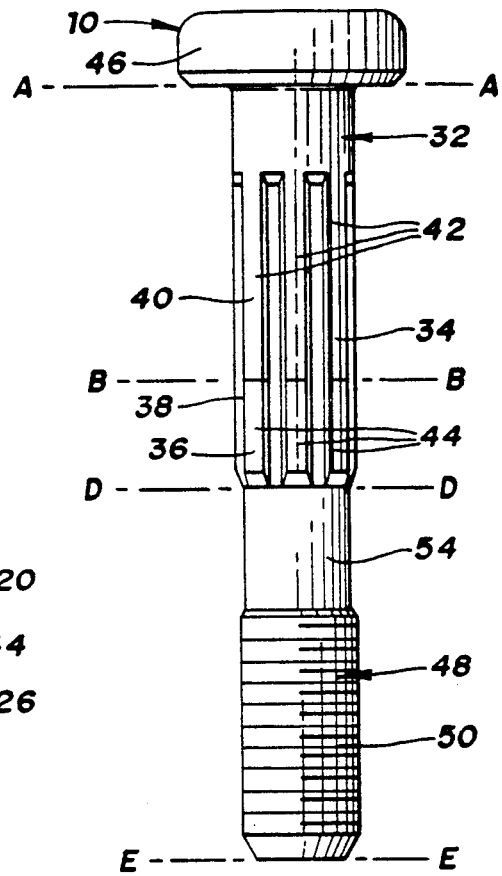
FIG. 2 is an enlarged view of one of the bolts of FIG. 1.

Referring now to the drawings in detail, numeral 10 generally indicates a connecting bolt of the present invention used in a connecting rod assembly generally designated 12 to hold the connecting rod 14 and connecting rod cap 16 together.

The connecting rod assembly, 12 includes a connecting rod 14 having a curved rod bearing surface 18 formed on one end and a rod lug 20 formed on each end of the rod bearing surface. The assembly also includes a connecting rod cap 16 having a curved cap bearing surface 24 corresponding to the rod bearing surface 18 of the rod and a cap lug 26 formed on each end. The rod lugs 20 and cap lugs 26 are constructed of a deformable material and each has a longitudinal, generally straight, cylindrical bore 28, 30 therein. The cap lugs 26 are engageable with the rod lugs 20 enabling the rod and cap bearing surfaces 18, 24 to form, in assembly, an annular housing or eye at the large end of the connecting rod adapted to encircle an axial crankpin portion of the crankshaft (not shown). When the cap lugs 26 engage the rod lugs 20, the bores 28, 30 align in coaxial relation with respect to one another so that bolts can be inserted therethrough.

Figure 3:
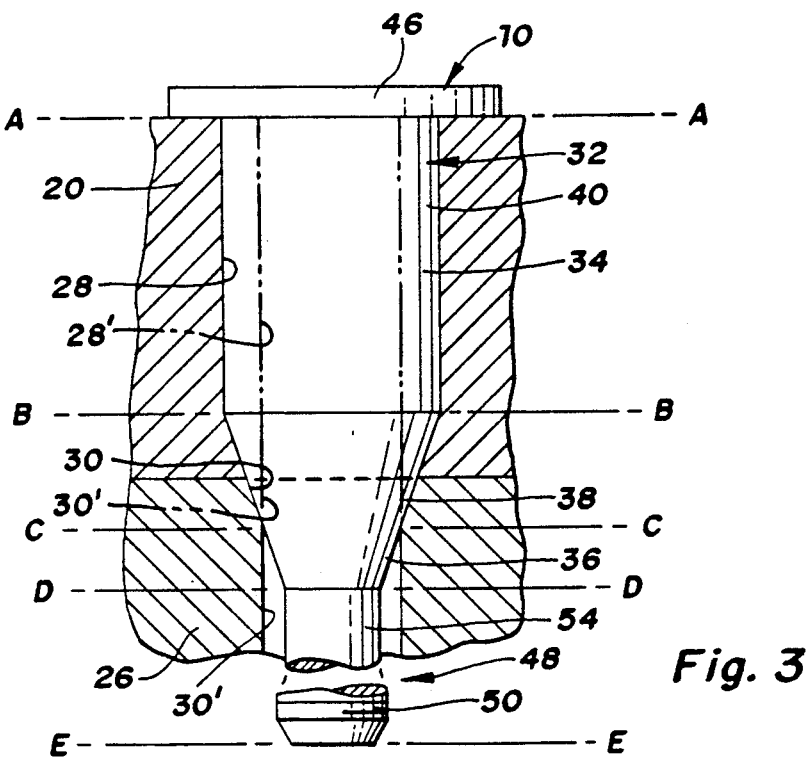
FIG. 3 is a schematic illustration of a bolt assembly in accordance with the present invention illustrating the engagement of the bolt with the walls of the bores.

The connecting bolt 10 comprises a shank 32 having an enlarged portion 34 and a pilot portion 36. The enlarged portion 34 is indicated in FIG. 3 as the portion of the shank 32 between planes A—A and C—C. Reference number 28' indicates the original size of the bore in the rod lug prior to the insertion of the enlarged portion 34 therein. Reference number 30' indicates the original size of the bore in the cap lug prior to the insertion of the enlarged portion 34 therein. Thus, the enlarged portion 34 has a cross section larger than the original sizes of the bores 28', 30'. The enlarged portion 34 is constructed of a deformable material. Since the lugs 20, 26 and enlarged portion 34 are constructed of deformable materials, the enlarged portion may be forcibly inserted into the bores 28', 30' and frictionally retained therein. It will be understood that either the enlarged portion 34 or the lugs 20, 26 may be constructed of deformable material and still fall within the scope of the invention.

The length of the enlarged portion 34 is sized to enable it to extend through the entire length of the bore 28 in the rod lug and a portion of the bore 30 in the cap lug as shown in FIG. 3 by the expanded walls of the bore in the rod lug and the part of the bore in the cap lug above plane C—C. Reference numeral 28 indicates the wall of the bore in the rod lug in an expanded condition as a result of the enlarged portion 34 extending therethrough. Reference numeral 30 indicates the wall of the bore in the cap lug in an expanded condition as a result of the enlarged portion 34 extending therethrough. The part of the bore 30' in the cap lug below plane C—C is shown as retaining its original size. The enlarged portion 34 is frictionally retained in the bores 28, 30 to hold the cap lug 26 and rod lug 20 tightly together in abutting relation with the bores in coaxial alignment. The limited extension of the enlarged portion 34 into the bore 30 in the cap lug, while sufficient to frictionally retain the enlarged portion in the bore, allows ready disengagement of the cap lug 26 from the enlarged portion without an undue amount of force. This facilitates disassembly of the cap lug 26 from the rod lug 20 which can be necessary for repairs, maintenance, improvements or the like.

The enlarged portion 34 adjacent the pilot portion 36 has a tapered part 38, indicated in FIG. 3 as the part of the enlarged portion between planes B—B and C—C, to facilitate insertion of the enlarged portion into the bores 28', 30', as will be described below. The tapered part 38 has a diameter which decreases in the axial direction toward the pilot portion 36. The length of the untapered part 40 of the enlarged portion is smaller than the length of the bore 28 in the rod lug so that, when the enlarged portion 34 is inserted into the bore 28 in the rod lug, a part of the tapered part 38 is disposed in the bore 28 as shown in FIG. 3. The tapered part 38 of the enlarged portion is also disposed in the cap lug 26 to facilitate connection of the cap lug to the rod lug 20, as will be described below. It will be understood that the entire enlarged portion 34 may be tapered. Alternatively, the enlarged portion 34 can be sized so that the untapered part 40 is equal to or larger than the length of the bore 28 in the rod lug so long as the tapered part 38 constitutes the entire part of the enlarged portion extending into the bore 30. For example, the enlarged portion can extend beyond the end of the bore 28 opposite the abutment between the lugs 20,26.

The cross section of the enlarged portion 34 should correspond generally to the cross section of the bores 28', 30' in the lugs in order for the enlarged portion to fit tightly in the bores and be frictionally retained therein. Therefore, the cross section of the enlarged portion 34 is circular to correspond to the generally cylindrical bores 28', 30' in the lugs. It will be understood that the cross section of the enlarged portion 34 may have other shapes. The cross section of the enlarged portion 34 is sufficiently large so that, when the cap lug 26 is disengaged from the enlarged portion, the enlarged portion remains frictionally retained in the rod lug 20 to reduce the likelihood of the bolt 10 being lost. Retainment of the enlarged portion 34 in the rod lug 20 also facilitates reassembly since reinsertion of the shank 32 into the rod lug 20 is not necessary and the bolt 10 will be in proper position for placement of the cap lug 26 thereon, as will be described below.

The enlarged portion 34 has longitudinal splines 42 on the surface thereof to facilitate the frictional fit of the enlarged portion in the bores 28, 30 in the lugs and prevent the shank 32 from turning in the bores. When the enlarged portion 34 having splines 42 thereon is inserted into the bores 28', 30', the splines either cut grooves in the walls of the bores and become embedded therein or the splines themselves deform, depending on the deformability of the spline material and the lug material. In either case, the frictional fit of the enlarged portion 34 in the bores 28, 30 is facilitated. The splines 42 may be formed by casting, molding, machining or other suitable process. The splines 42 also facilitate formation of the tapered part 38 as will be described below. The splines 42 enable the enlarged portion 34 to conform more readily to the shapes of the bores 28', 30' in the lugs since the splines deform more readily than a solid shank.

The pilot portion 36, indicated in FIG. 3 as the portion of the shank 32 between planes C—C and D—D, is tapered and, has a cross section smaller than the bores 28', 30'. Insertion of the shank 32 into the bores 28', 30' is thereby facilitated since the pilot portion 36 can be readily placed in the bores as compared to direct insertion of the ends of the enlarged portion 34 which are larger than the bores. The tapering of the pilot portion 36 also facilitates alignment of the shank 32 in the bores 28', 30' since, as the pilot portion passes through the bores and engages the walls thereof, the enlarged portion 34 is gradually guided into coaxial relation with respect to the bores. The shape of the cross section of the pilot portion 36 should correspond generally to that of the bores 28', 30' in the lugs so that the pilot portion smoothly engages the walls of the bores. The cross section of the pilot portion 36 is therefore circular. It will be understood however that the cross section of the pilot portion 36 may have other shapes.

The tapered part 38 of the enlarged portion guides the enlarged portion 34 into coaxial relation with respect to the bores 28', 30' in a similar manner as the pilot portion 36 described above. The tapered end 38 also facilitates connection of the cap lug 26 to the rod lug 20 since the size of the enlarged portion 34 which extends into the bore 30 in the cap lug is reduced thereby reducing the force required to insert the enlarged portion into the bore. Moreover, the tapered part 38 enables the cap lug 26 to be pressed onto the enlarged portion 34 after that portion has been inserted into the rod lug 20 so that the lugs need not be held together in proper alignment while the shank 32 is inserted into the bores 28', 30'. The shank 32 will not be forced out of the bore 28 in the rod lug by the press of the cap 16 since the fit produced by the larger, untapered part 40 is tighter than the fit produced by the tapered part 38.

The pilot portion 36 of the bolt is constructed by rolling a section of the shank 32 having a constant cross section. The section of the shank 32 to be rolled has splines 44 formed on the surface thereof by casting, molding, machining or the like prior to the rolling process. During the rolling process, the deformed metal flows into the spaces between the splines 44 to facilitate formation of the taper. Since the greatest deformation is produced adjacent the narrow end of the pilot portion 36, the splines 44 in this region appear more flattened as compared to the splines at the opposite end.

The bolt 10 further comprises a head 46 attached to the end of the enlarged portion 34 opposite the pilot portion 36. The head 46 engages the rod lug 20 to limit the extension of the enlarged portion 34 into the bore 30 of the cap lug. This helps to ensure that the correct length of the enlarged portion 34 will extend into the bore 30 in the cap lug so that the enlarged portion is frictionally retained therein yet can also be readily disengaged without an undue amount of force. Allowing the correct length of the enlarged portion 34 to extend into the bore 30 in the cap lug is important since if the length extending therein is too small, the frictional retainment may not be sufficient to hold the cap lug 26 and rod lug 20 together. If an excessive part of the enlarged portion 34 is permitted to extend into the bore 30 in the cap lug, a large force could be required to separate the cap lug 26 from the enlarged portion making disassembly difficult. It will be understood that the enlarged portion 34 may have other kinds of stops at its end.

The shank 32 of the bolt has a reduced portion 48, indicated in FIG. 3 as the portion of the shank between planes D—D and E—E, adjacent the end of the pilot portion 36 opposite the enlarged portion 34. The reduced portion 48 has a generally circular cross section smaller than the bores 28', 30'. The reduced portion 48 also has an inner end 54 adjacent the pilot portion and a threaded end 50 opposite the pilot portion. The inner end 54 has a sufficient length so that, when the shank 32 is inserted into the bores 28, 30, the threaded end 50 extends out of the bore 30' in the cap lug so that a nut 52 can be screwed thereto into engagement with the cap lug 26. It will be understood that the reduced portion 48 may have other kinds of stops at its end. The inner end 54 also has a cross section smaller than the cross section of the threaded end 50 to reduce deformation of the threads, as will be described below.

The threaded end 50 of the reduced portion ordinarily must extend out of the bore 30' in the cap lug since, in most internal combustion engines, there is insufficient space adjacent the rod lug 20 to apply a tool to tighten the nut 52. The frictional retainment of the enlarged portion 34 in the bores 28, 30 enables the lugs 20, 26 to be held together in correct alignment on a crankshaft prior to application of the nut 52 without a clamp or the like. Moreover, the nut 52 can be applied at a later time while the lugs 20, 26 remain retained together in correct alignment if the frictional fit between the enlarged portion 34 and the lugs is sufficiently tight.

With the head 46 attached to one end of the shank 32 as described above, the lugs 20, 26 become sandwiched between the head 46 and the nut 52 as shown in FIG. 1. The strength of the connections between the shank 32, cap 46 and nut 52 should be sufficient to hold the cap lug 26 and rod lug 20 in abutting relation during actual engine operation. The frictional fit between the enlarged portion 34 and the bores 28, 30 would probably not be sufficient to hold the lugs 20, 26 together during actual engine operation due to the large crankshaft velocity and forces imposed on the connecting rod assembly 12. To reduce fatigue of the bolts 10 and facilitate maintenance of contact between the lugs 20, 26 during operation, each nut 52 is tightened at assembly to stress its respective shank 32 beyond any operating stress that will be encountered. The bolt stretch resulting from this assembly stress takes place in the end 54 of the reduced portion adjacent the pilot portion 36 because of its relatively smaller cross section and not in the threaded end 50.

Depending on the nature of the application of the bolt 10, the frictional fit of the enlarged portion 34 in the bores may be sufficient to hold the lugs 20,26 together thereby making the threaded reduced portion 48 unnecessary. This may be the case, for example, if the lugs 20,26 are to be held together for short periods of time or are not subjected to large forces tending to separate them. It will therefore be understood that the shank 32 may lack the reduced portion 48 and still fall within the scope of the invention.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. A connecting rod assembly comprising:
   a connecting rod having a curved rod bearing surface attached to one end, said rod bearing surface having a rod lug formed thereon;
   a connecting rod cap having a curved cap bearing surface and a cap lug attached thereto,
   said cap lug being engageable with said rod lug enabling said rod and cap bearing surfaces to form an annular housing adapted to encircle an axial portion of a crankshaft to connect said connecting rod thereto, said rod lug having a straight bore therein which coaxially aligns with a straight bore in said cap lug when said cap lug engages said rod lug; and
   a bolt comprising
   a shank having an enlarged portion and a pilot portion,
   said enlarged portion having a cross section larger than each of said bores prior to insertion of the enlarged portion therein, said enlarged portion having a tapered part adjacent to said pilot portion, said tapered part having a diameter which decreases in the axial direction toward said pilot portion, said enlarged portion being constructed of a sufficiently deformable material to enable insertion of said enlarged portion into each of said bores and frictional retainment of said enlarged portion therein,
   said enlarged portion having a length sized so that, when said bores coaxially adjoin one another, said enlarged portion extends through a sufficient axial portion of each of said bores to hold said rod and cap lugs in abutting relation wherein said tapered part constitutes the entire part of said enlarged portion extending into one of said bores and said tapered part has a length sized to enable its ready disengagement from said one of said bores, said pilot portion having a cross section smaller than each of said bores to facilitate insertion of said shank therein, and said pilot portion being tapered so that, when said pilot portion passes through said bores, said enlarged portion is guided into coaxial relation therewith.

2. A connecting rod assembly as set forth in claim 1 wherein said enlarged portion extends through the entire length of said bore in said rod lug.

3. A connecting rod assembly as set forth in claim 1 wherein said tapered part extends into the other one of said bores.

4. A connecting rod assembly as set forth in claim 1 wherein said shank has a circular cross section.

5. A connecting rod assembly as set forth in claim 1 wherein the cross section of said enlarged portion is sized so that, when said rod and cap lugs are disengaged, said enlarged portion is frictionally retained in one of said bores.

6. A connecting rod assembly as set forth in claim 1 wherein a part of said enlarged portion has longitudinal splines on the surface thereof to facilitate said frictional retention of said enlarged portion in one of said bores.

7. A connecting rod assembly as set forth in claim 1 wherein said bolt further comprises a head attached to the end of said enlarged portion opposite said pilot portion so that, when said shank is inserted into one of said bores said head engages the end of one of said bores to limit the extension of said enlarged portion into the other one of said bore to facilitate said frictional retainment of said enlarged portion therein and to allow ready disengagement of said other one of said bores from said enlarged portion.

8. A connecting rod assembly as set forth in claim 1 wherein said shank further comprises a reduced portion extending from the end of said pilot portion opposite said enlarged portion, said reduced portion having a cross section smaller than each of said bores and a threaded end, said reduced portion having sufficient length so that, when said shank is inserted into said bores, said threaded end extends out of one of said bores and a nut is screwed thereto so that the nut engages the end of one of said bores to retain said rod and cap lugs in said abutting relation.

* * * * *